(12) United States Patent
Kimura

(10) Patent No.: US 10,939,021 B2
(45) Date of Patent: Mar. 2, 2021

(54) IMAGE PICKUP APPARATUS

(71) Applicant: CANON KABUSHIKI KAISHA, Tokyo (JP)

(72) Inventor: Yasunori Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/681,637

(22) Filed: Nov. 12, 2019

(65) Prior Publication Data
US 2020/0084347 A1 Mar. 12, 2020

Related U.S. Application Data

(63) Continuation of application No. PCT/JP2018/020029, filed on May 24, 2018.

(30) Foreign Application Priority Data

May 31, 2017 (JP) .............................. JP2017-107450

(51) Int. Cl.
H04N 5/225 (2006.01)
H04N 5/232 (2006.01)
G03B 17/02 (2006.01)

(52) U.S. Cl.
CPC .......... H04N 5/2252 (2013.01); G03B 17/02 (2013.01); H04N 5/232 (2013.01); H04N 5/2254 (2013.01)

(58) Field of Classification Search
None
See application file for complete search history.

(56) References Cited

U.S. PATENT DOCUMENTS

| 10,665,073 | B1* | 5/2020 | Richerson, Jr. ..... H04N 5/23296 |
| 2003/0023150 | A1* | 1/2003 | Yokoi ................ A61B 1/00032 600/300 |
| 2007/0019952 | A1* | 1/2007 | Fujimori ............. H04N 5/2254 396/529 |
| 2007/0182827 | A1* | 8/2007 | Sassa ..................... H04N 7/185 348/211.2 |
| 2014/0160274 | A1* | 6/2014 | Ishida ..................... G01S 19/14 348/113 |
| 2015/0062333 | A1* | 3/2015 | Kilner .................. H04N 5/2252 348/143 |
| 2015/0085121 | A1* | 3/2015 | Englander .......... H04N 5/23293 348/148 |
| 2015/0309391 | A1* | 10/2015 | Reekie ................... G03B 17/08 348/376 |
| 2016/0127643 | A1* | 5/2016 | Huerta ................. H04N 5/2253 348/211.2 |

(Continued)

FOREIGN PATENT DOCUMENTS

| JP | 8-265867 A | 10/1996 |
| JP | 2007-060237 A | 3/2007 |

(Continued)

*Primary Examiner* — William B Perkey
(74) *Attorney, Agent, or Firm* — Canon U.S.A., Inc. I.P. Division

(57) ABSTRACT

A monitoring camera according to the present invention includes a lens unit, a dome cover made of resin or glass and having a substantially hemispherical first space covering the lens unit, a housing configured to support the dome cover, and an antenna capable of wirelesly communicating with external devices. The antenna is disposed in the first space of the dome cover.

11 Claims, 15 Drawing Sheets

(56) References Cited

U.S. PATENT DOCUMENTS

| | | | | |
|---|---|---|---|---|
| 2018/0063432 A1* | 3/2018 | Wada | .................... | H04N 5/2254 |
| 2019/0020800 A1* | 1/2019 | Fujii | ..................... | H04N 5/2252 |
| 2019/0104282 A1* | 4/2019 | Siu | ................... | G08B 13/19632 |
| 2019/0312977 A1* | 10/2019 | Oliver | .................... | H04M 15/62 |
| 2020/0084347 A1* | 3/2020 | Kimura | .................. | H04N 5/222 |

FOREIGN PATENT DOCUMENTS

| | | |
|---|---|---|
| JP | 2007-104255 A | 4/2007 |
| JP | 2012-109687 A | 6/2012 |
| JP | 2014-048511 A | 3/2014 |
| JP | 2014-236318 A | 12/2014 |
| JP | 2015-61230 A | 3/2015 |
| JP | 2017-79345 A | 4/2017 |

\* cited by examiner

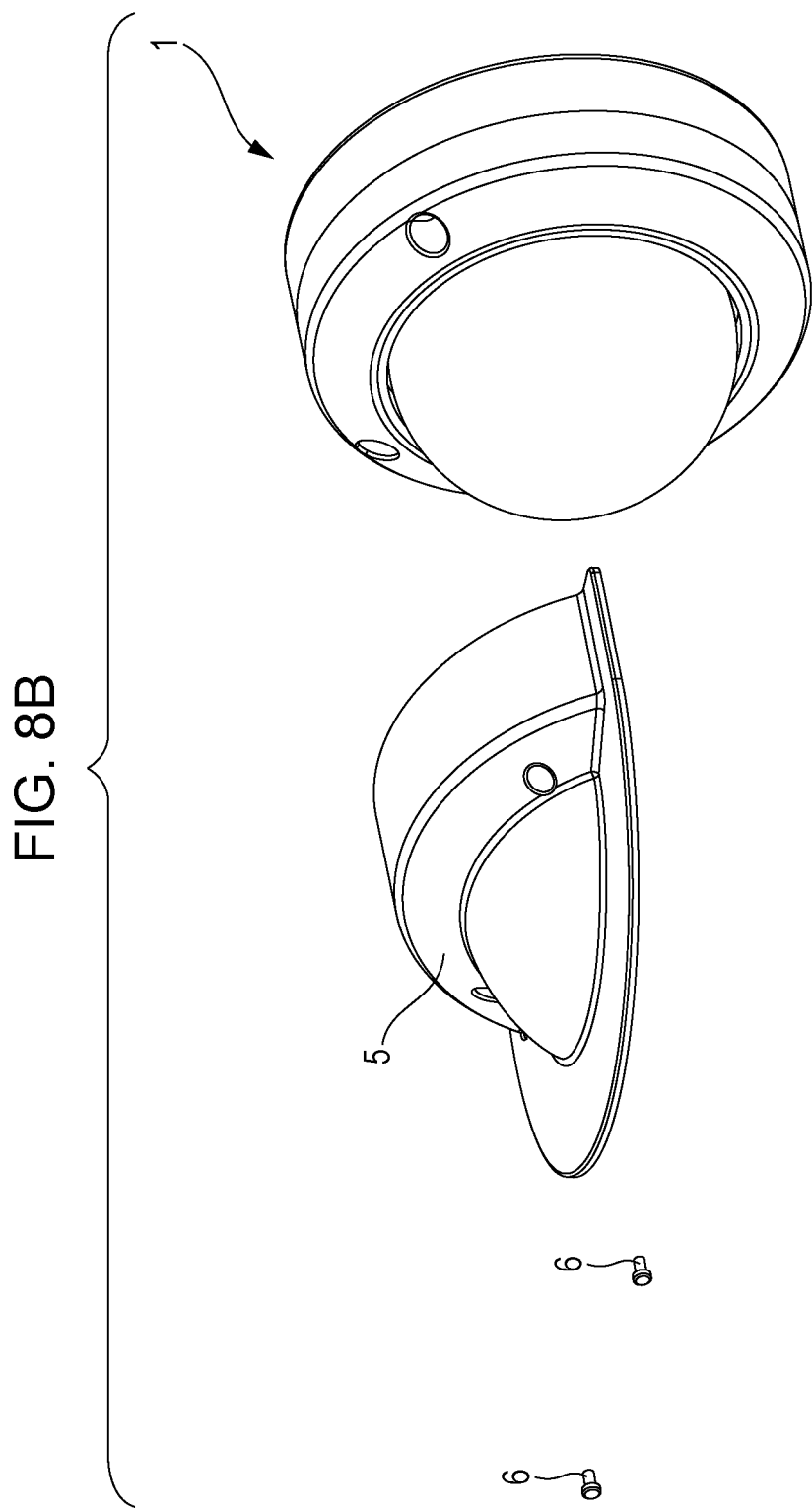

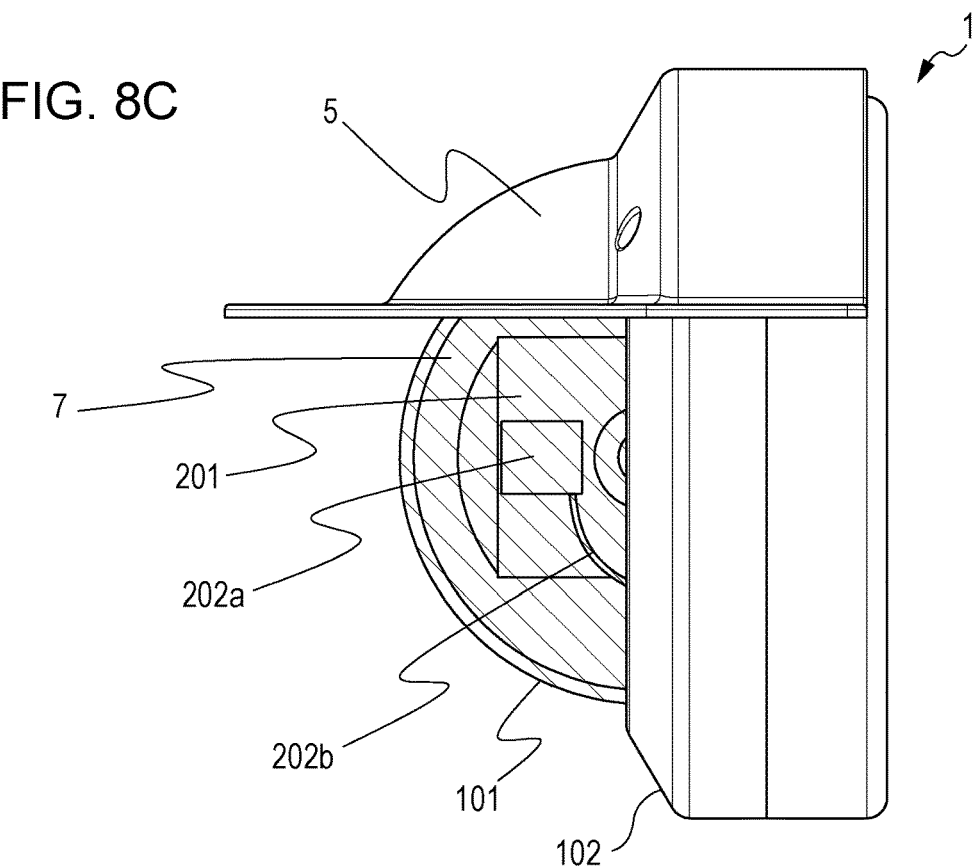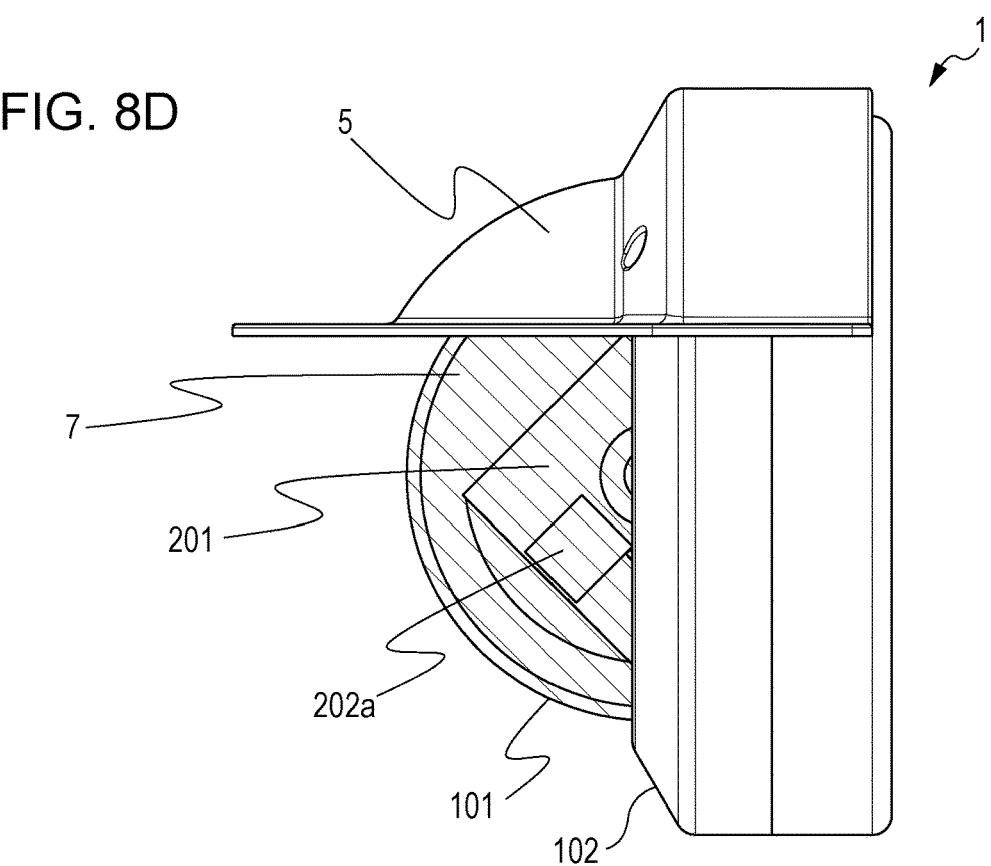

IMAGE PICKUP APPARATUS

CROSS-REFERENCE TO RELATED APPLICATIONS

This application is a Continuation of International Patent Application No. PCT/JP2018/020029, filed May 24, 2018, which claims the benefit of Japanese Patent Application No. 2017-107450, filed May 31, 2017, both of which are hereby incorporated by reference herein in their entirety.

TECHNICAL FIELD

The present invention relates to an image pickup apparatus, such as a network camera, that includes a wireless communication means.

BACKGROUND ART

Conventionally, in network cameras, a connection between the camera and a recording device has generally been a wired connection using, for example, a LAN cable. The wired connection requires wiring to the recording device and installation work associated with the wiring. This is a burden in building a monitoring system. In recent years, there has been a growing need for network cameras that are capable of connecting via wireless communication.

Network cameras often have metal exteriors so as not to be broken by external shock. The presence of metal may interfere with wireless communication using wireless communication means. Therefore, it may be difficult for a network camera having a metal exterior to achieve high communication quality.

Accordingly, for example, a radio antenna of a digital camera having a metal exterior may be disposed outside a housing (metal exterior) and covered with a resin having high radio-wave permeability (see Japanese Patent Laid-Open No. 2007-060237).

However, the configuration disclosed in Japanese Patent Laid-Open No. 2007-060237 requires a complex mechanism. This makes it difficult to achieve high robustness, water resistance, and durability required for network cameras, which are supposed to continue to operate for a longer period of time than digital cameras.

SUMMARY OF INVENTION

An object of embodiments described herein is to provide an image pickup apparatus that can achieve high-performance wireless communication with a simple configuration.

An image pickup apparatus according to the present invention includes a lens unit, a dome cover made of resin or glass and having a substantially hemispherical first space covering the lens unit, a housing configured to support the dome cover, and an antenna capable of wirelessly communicating with external devices. The antenna is disposed in the first space of the dome cover.

Further features of the present invention will become apparent from the following description of exemplary embodiments with reference to the attached drawings.

BRIEF DESCRIPTION OF DRAWINGS

FIG. 8B presents an external view of the network monitoring camera and an explanatory diagram for explaining an interior of the network monitoring camera according to the sixth embodiment.

FIG. 8C is an explanatory diagram for explaining an interior of the network monitoring camera of the image pickup unit 2 according to the sixth embodiment.

FIG. 8D is an explanatory diagram for explaining an interior of the network monitoring camera of the image pickup unit 2 according to the sixth embodiment.

DESCRIPTION OF EMBODIMENTS

First Embodiment

Figure 1A:
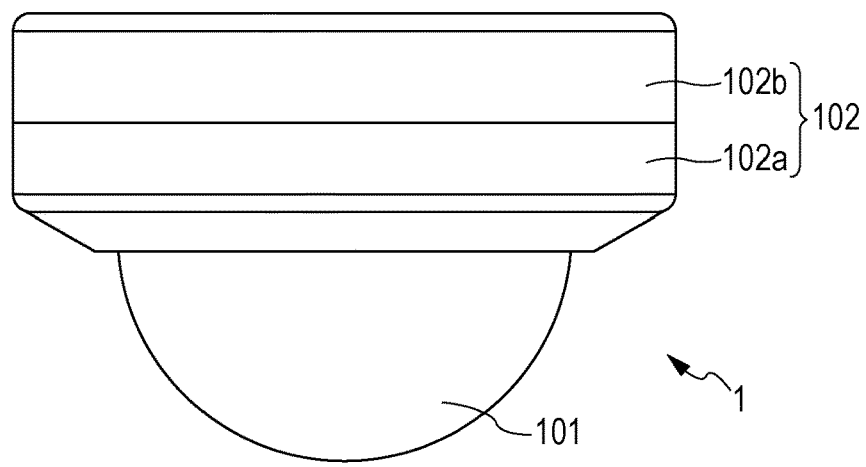
FIG. 1A presents an external view and an exploded perspective view of a network monitoring camera according to a first embodiment of the present invention.
Figure 1B:
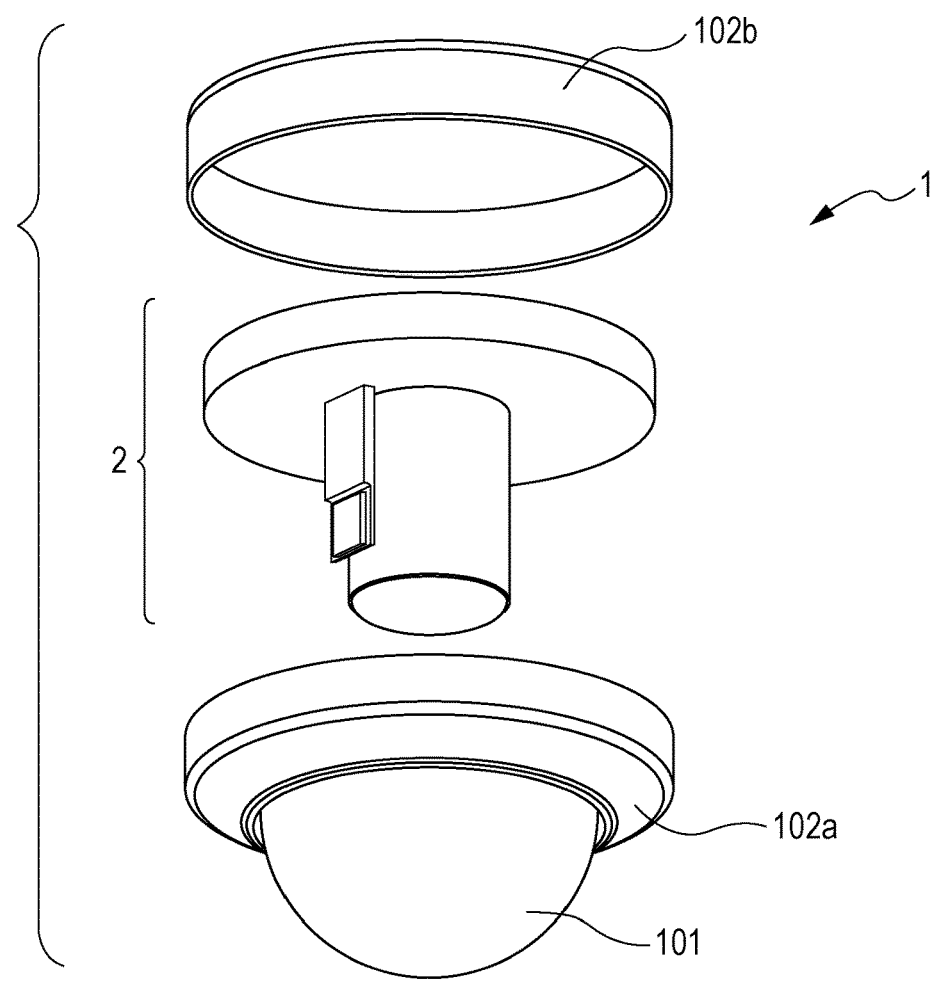
FIG. 1B presents an external view and an exploded perspective view of the network monitoring camera according to the first embodiment of the present invention.
Figure 2A:
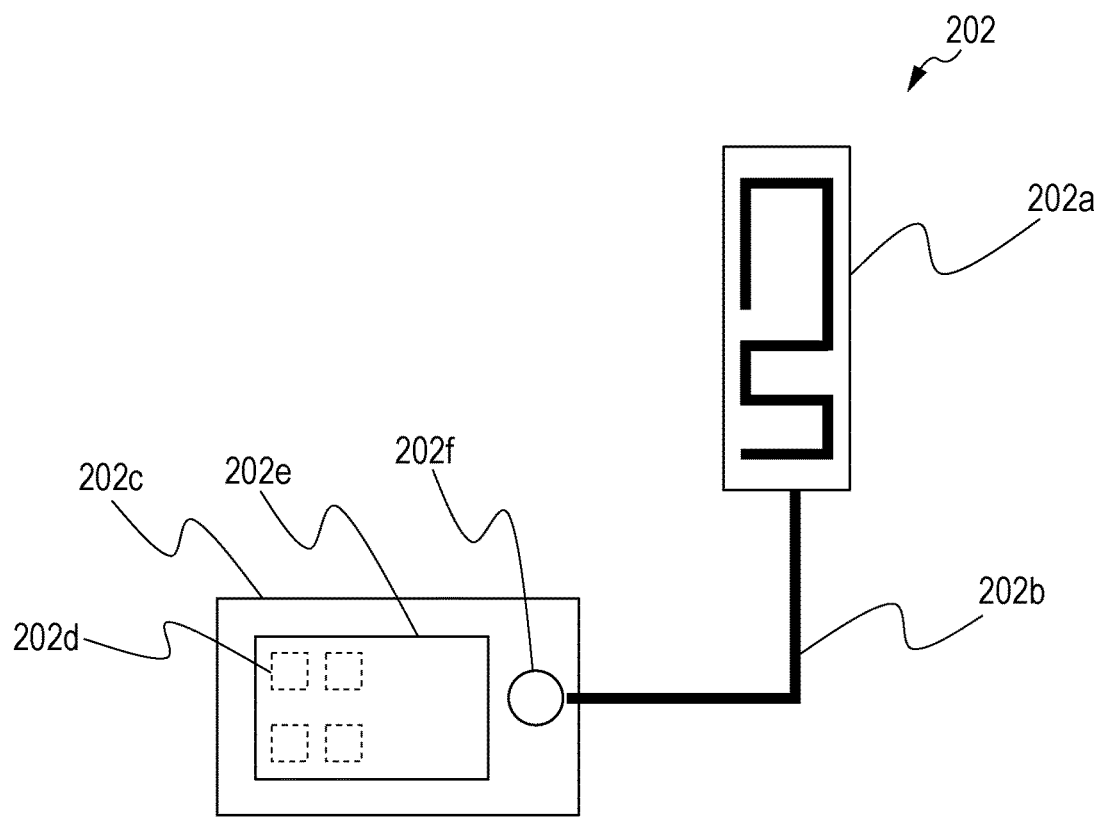
FIG. 2A is a schematic diagram of a wireless communication means according to an embodiment of the present invention.
Figure 2B:
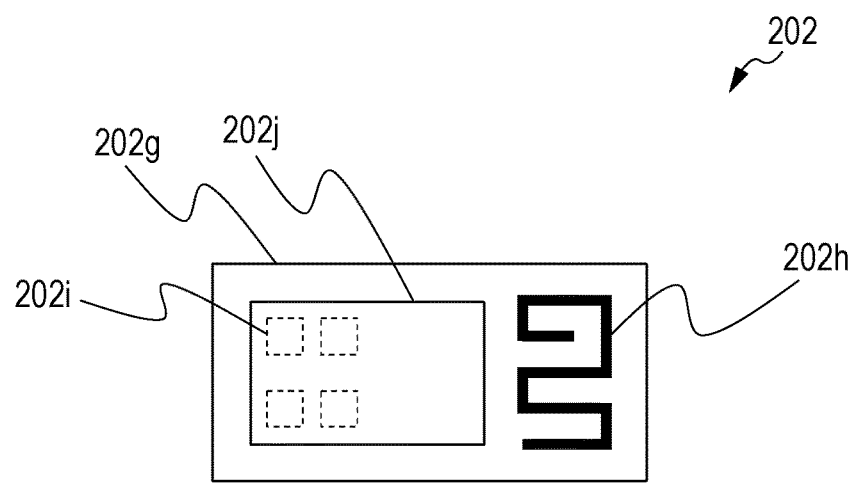
FIG. 2B is a schematic diagram of another wireless communication means according to the embodiment of the present invention.
Figure 3A:
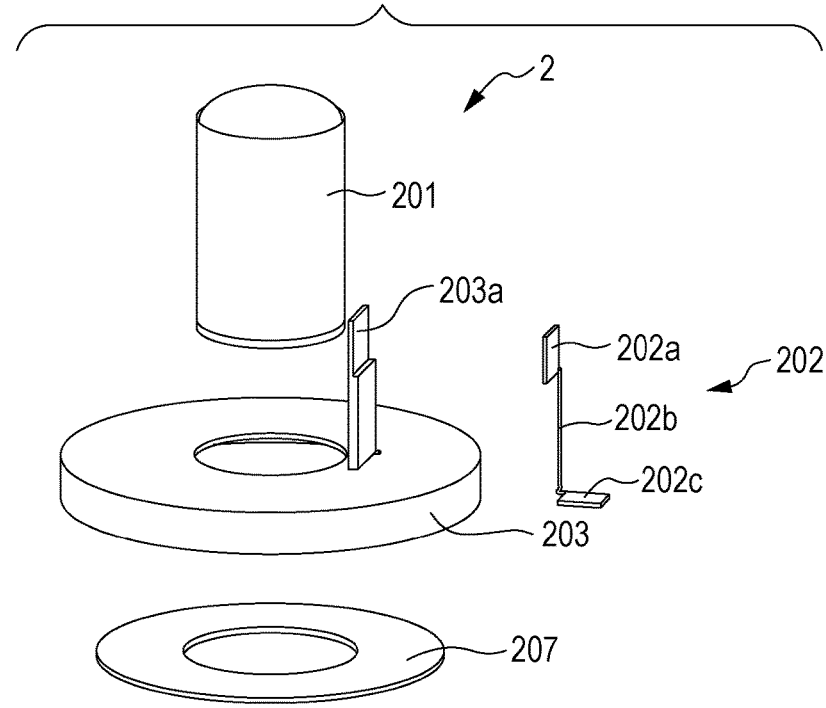
FIG. 3A presents an exploded perspective view of an image pickup unit 2 and an explanatory diagram for explaining an interior of the network monitoring camera according to the first embodiment.
Figure 3B:
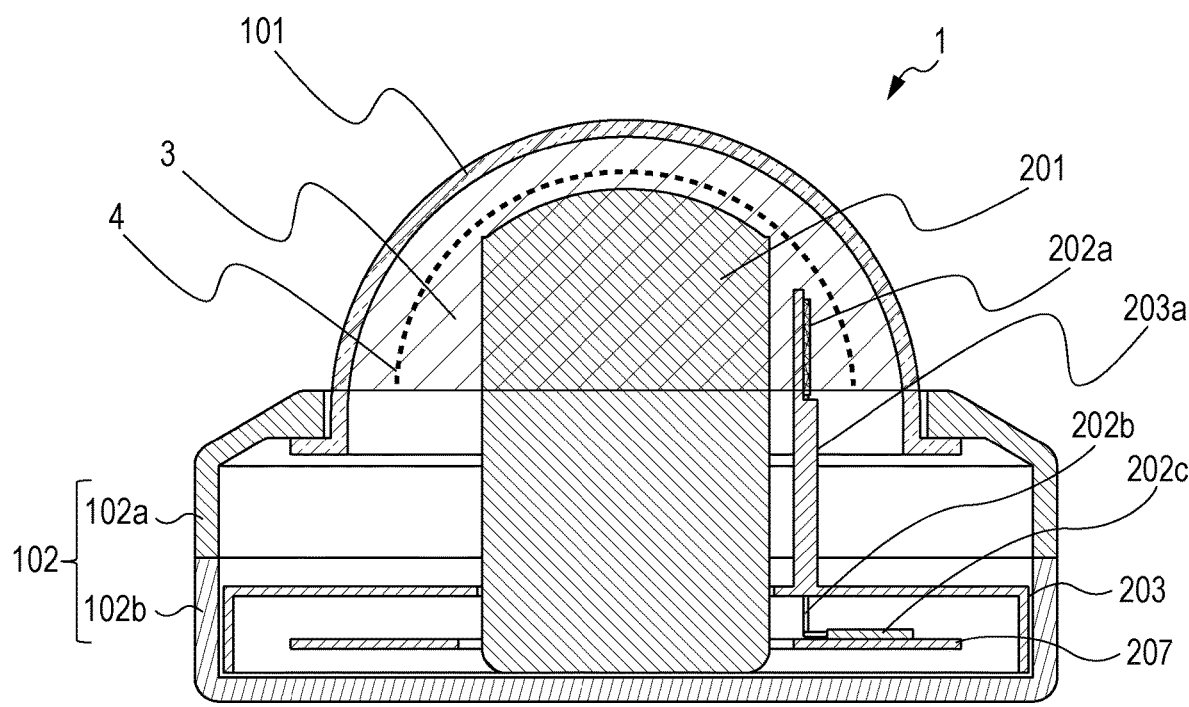
FIG. 3B presents an exploded perspective view of the image pickup unit 2 and an explanatory diagram for explaining an interior of the network monitoring camera according to the first embodiment.

An exemplary embodiment of the present invention will now be described with reference to the drawings. FIG. 1A is an external view of a network monitoring camera 1 (hereinafter referred to as monitoring camera) according to the embodiment of the present invention. FIG. 1B is an exploded perspective view of the monitoring camera illustrated in FIG. 1A. FIG. 2A is a schematic diagram of a wireless communication means of an antenna-substrate separate type. FIG. 2B is a schematic diagram of a wireless communication means of an antenna-substrate integrated type. FIG. 3A is an exploded perspective view of an image pickup unit 2 according to a first embodiment. FIG. 3B is an explanatory diagram for explaining an interior of the monitoring camera 1.

The present embodiment deals with a monitoring camera included in an image monitoring system as an example. Specifically, the image monitoring system is connected, for example, to a server (monitoring device) in an external image monitoring center so as to be able to wirelessly communicate with the server, and thus the image monitoring system monitors picked-up images on the server side. However, the monitoring camera described herein is not limited to one that is included in such an image monitoring system.

As illustrated in FIG. 1, the monitoring camera 1 of the present embodiment includes a housing 102, a dome cover 101, an image pickup unit 2, and a wireless communication means 202.

The housing 102 includes a first housing 102a and a second housing 102b that support the dome cover 101. The first housing 102a and the second housing 102b are made of a metal material. A sealing material is disposed between the first housing 102a and the second housing 102b. A printed circuit board 207 is disposed inside the housing 102. The printed circuit board 207 includes, for example, a video processing engine, a communication processing engine, a memory, and a power supply IC. The printed circuit board 207 has external interfaces mounted thereon, such as an RJ45 connector, an external input/output connector, a power supply connector, an audio input/output connector, a video-out connector, and a connector for an external memory, such as an SD card.

The dome cover 101 is a transparent member configured to protect a lens unit 201 (see FIG. 3B) of the image pickup unit 2. The dome cover 101 is disposed on the front side (or adjacent to an object) in a photographing range of the lens unit 201. The dome cover 101 is substantially hemispherical and is made of resin, such as PC, or glass. A sealing material is disposed between the dome cover 101 and the first housing 102a.

The dome cover 101 and the housing 102 contains therein electric components, such as a heater, a microphone, a speaker, an LED, and a motor (which are not shown). The electric components are connected to one another, for example, by an electric cable, an FPC, or an FFC.

As illustrated in FIG. 3A, the image pickup unit 2 includes the lens unit 201, a base 203, a support portion 203a, the wireless communication means 202, and the printed circuit board 207. The lens unit 201 includes a lens group, a lens holder, a printed circuit board, and an image pickup element (which are not shown) and is secured to the second housing 102b, for example, with screws (not shown). The base 203 is a circular member having an opening in the center thereof for accommodating the lens unit 201. The base 203 is secured to the second housing 102b, for example, with screws (not shown). The support portion 203a supports an antenna 202a. The support portion 203a is rectangular and protrudes from the base 203 toward the dome cover 101. One end of the support portion 203a is disposed inside the housing 102, whereas the other end of the support portion 203a is disposed inside the dome cover 101. The antenna 202a is disposed adjacent to the other end of the support portion 203a.

The wireless communication means 202 is for transmitting and receiving data using a wireless communication technique, such as a wireless LAN. The wireless communication means 202 may be of a type where, as illustrated in FIG. 2A, a substrate 202c and the antenna 202a are configured as separate members, or may be of a type where, as illustrated in FIG. 2B, the substrate 202g and the antenna 202h are configured to form an integral unit.

FIG. 2A illustrates the antenna 202a and the substrate 202c configured as separate members. The antenna 202a is electrically connected to the substrate 202c by a connection cable 202b.

The substrate 202c has, for example, IC chips 202d, a metal sheet 202e, and a connector 202f, which are connected to the printed circuit board 207 and other components, for example, via connectors, screws, and PCI slots (which are not shown).

FIG. 2B illustrates an antenna 202h and a substrate 202g configured to form an integral unit.

The substrate 202g has, for example, IC chips 202i and a metal sheet 202j, which are connected to the printed circuit board 207 and other components, for example, via connectors, screws, and PCI slots (which are not shown).

The antenna 202a is secured to the support portion 203a, for example, with screws. The antenna 202a is disposed away from components that interfere with wireless communication, such as the printed circuit board 207 that generates a lot of electrical noise and the housing 102 that is made of metal. The antenna 202a may be disposed at any position in a substantially hemispherical first space 3 (indicated by diagonal lines in FIG. 3B) which is inside the dome cover 101. It is preferable, however, that the antenna 202a be disposed as close as possible to the dome cover 101.

This configuration enables high-performance wireless communication, because the antenna 202a is disposed away from the printed circuit board 207 that generates a lot of electrical noise and the housing 102 that is made of metal.

Although the wireless communication means 202 of an antenna-substrate separate type is described as an example in the present embodiment, the wireless communication means 202 of an antenna-substrate integrated type, illustrated in FIG. 2B, may be used.

Second Embodiment

Figure 4A:
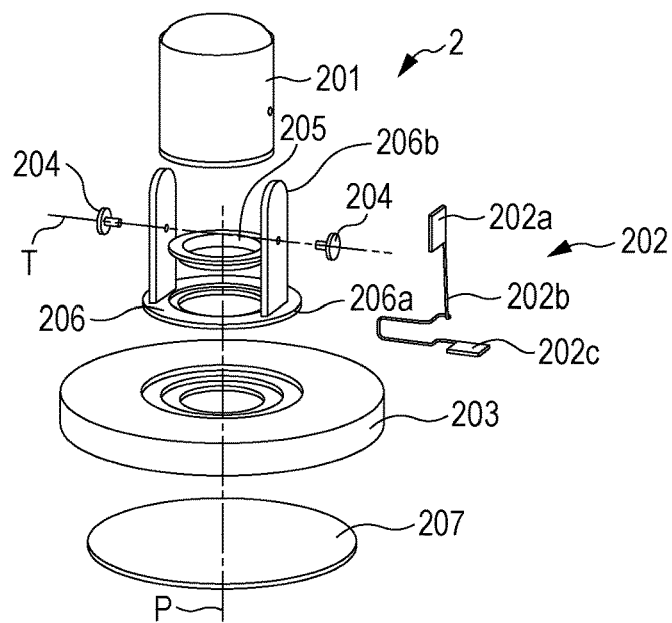
FIG. 4A presents an exploded perspective view of the image pickup unit 2 and an explanatory diagram for explaining an interior of a network monitoring camera according to a second embodiment.
Figure 4B:
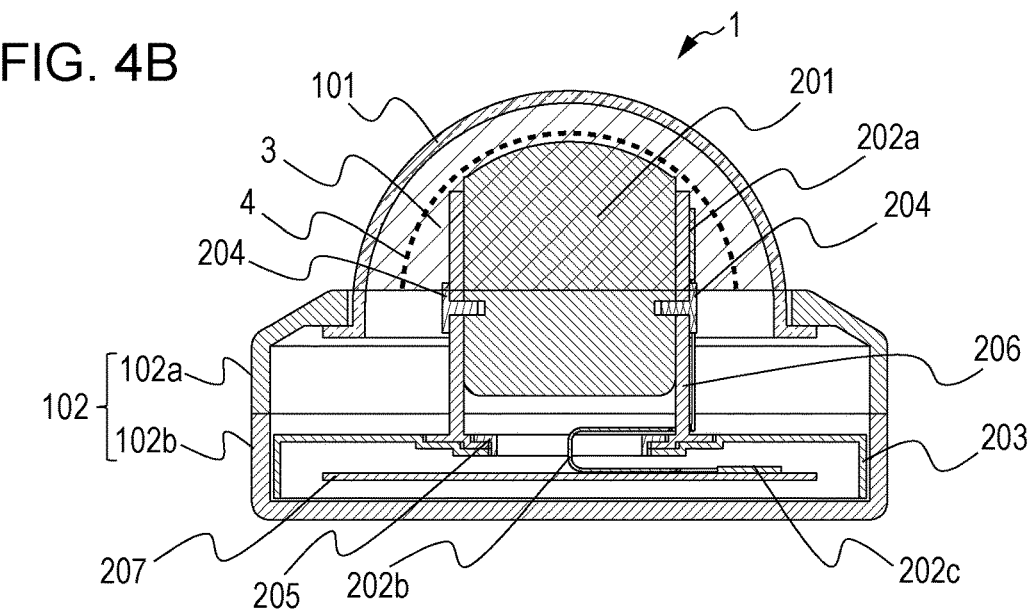
FIG. 4B presents an exploded perspective view of the image pickup unit 2 and an explanatory diagram for explaining an interior of the network monitoring camera according to the second embodiment.
Figure 4C:
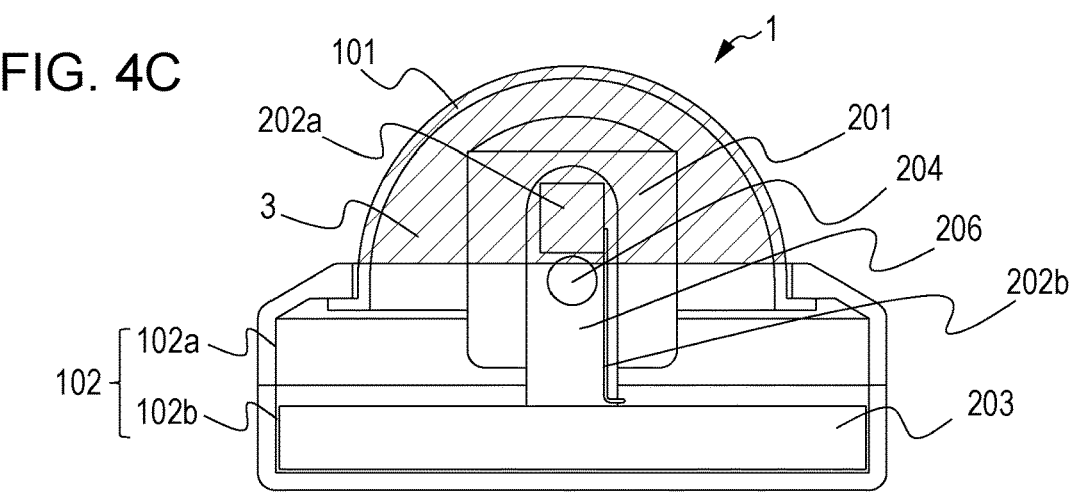
FIG. 4C presents an exploded perspective view of the image pickup unit 2 and an explanatory diagram for explaining an interior of the network monitoring camera according to the second embodiment.

The first embodiment has described an example where the lens unit 201 does not pan or tilt. A second embodiment will describe an antenna arrangement suitable for a monitoring camera (hereinafter referred to as PT monitoring camera) that is capable of panning and tilting. FIG. 4A is an exploded perspective view of the image pickup unit 2 according to the second embodiment. FIG. 4B is an explanatory diagram for explaining an interior of the monitoring camera 1 according to the second embodiment. FIG. 4C is an explanatory diagram for explaining an interior of the monitoring camera 1, with the lens unit 201 directed to the zenith.

As illustrated in FIG. 4A, the image pickup unit 2 according to the second embodiment includes the lens unit 201, the wireless communication means 202, the base 203, securing members 204 and 205, a pan base 206, and the printed circuit board 207.

The base 203 is disposed inside the second housing 102b and secured to the second housing 102b, for example, with screws (not shown). The base 203 has a circular opening in the center thereof for accommodating the pan base 206.

The pan base 206 supports the lens unit 201. The pan base 206 is supported in such a manner as to be rotatable about a pan rotation axis P in the pan direction, with respect to the base 203. The pan base 206 includes a ring portion 206 and a pair of support portions 206b protruding from the ring portion 206 toward a zenith portion of the dome cover 101.

The pan base 206 is rotatably secured to the base 203, for example (not shown), by a securing structure using an elastic component, such as a wave washer or a metal sheet, or screws; an engaging structure using gears; or a structure that electronically controls rotation of the gears with a motor.

With the securing members 204, the lens unit 201 is secured to the pan base 206 in such a manner as to be rotatable about a tilt rotation axis T in the tilt direction. Examples of the structure for rotatably securing the lens unit 201 to the pan base 206 include a structure that exerts a retaining force using screws, a flat washer, or a spring washer; and a structure that exerts a retaining force with an elastic member sandwiched between the lens unit 201 and the pan base 206.

The securing member 205 secures the pan base 206 to the base 203 in such a manner that the pan base 206 is rotatable in the pan direction.

The antenna 202a is disposed in the substantially hemispherical first space 3 (indicated by diagonal lines in FIG. 4B and FIG. 4C) inside the dome cover 101, closer to the zenith of the dome cover 101 than the center of rotation in the tilt direction is (i.e., the antenna 202a is disposed opposite the housing 102 with respect to the center of rotation in the tilt direction). The antenna 202a is secured to one of the support portions 206b, for example, with screws (not shown).

This configuration of the PT monitoring camera also enables high-performance wireless communication, because the antenna 202a is disposed away from the printed circuit board 207 that generates a lot of electrical noise and the housing 102 that is made of metal.

Since the antenna 202a is disposed on the pan base 206, the lens unit 201 can be prevented from interfering with the antenna 202a during tilt rotation.

Third Embodiment

Figure 5A:
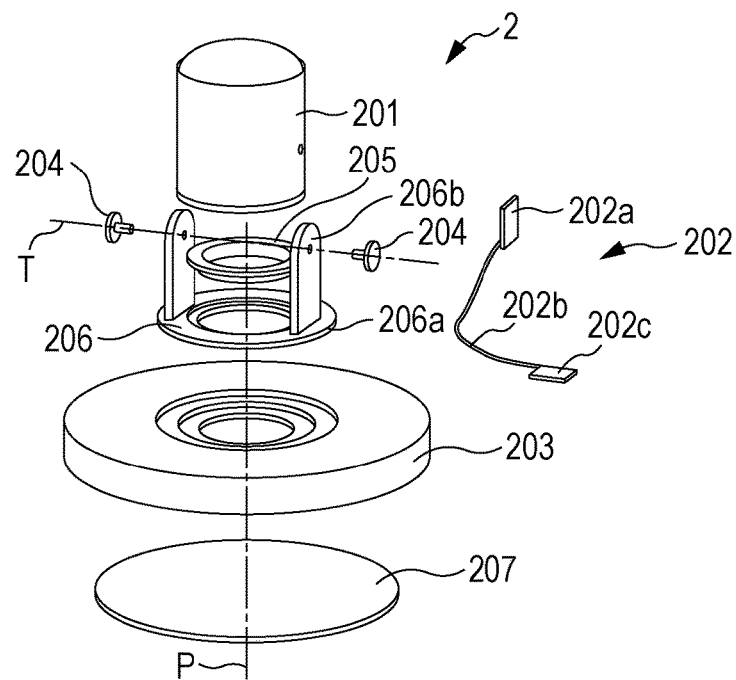
FIG. 5A presents an exploded perspective view of the image pickup unit 2 and an explanatory diagram for explaining an interior of a network monitoring camera according to a third embodiment.
Figure 5B:
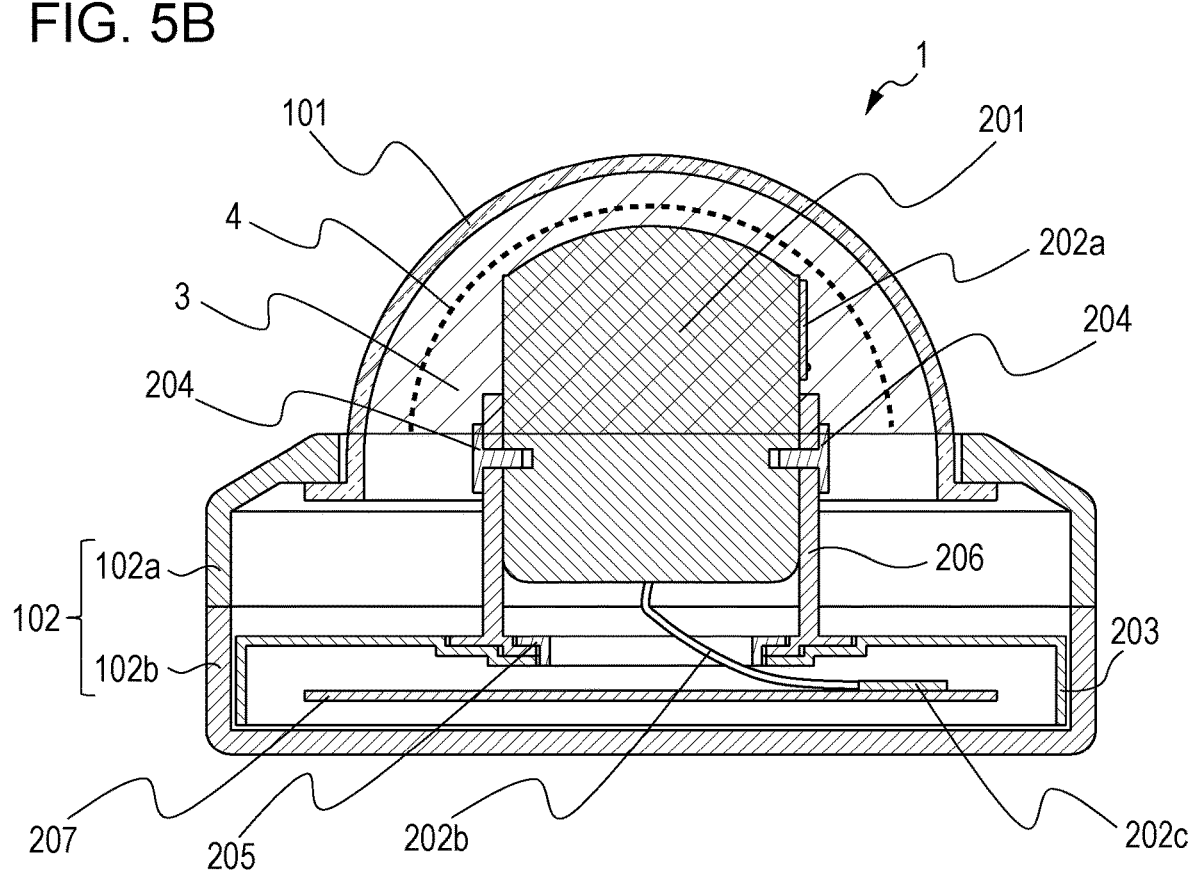
FIG. 5B presents an exploded perspective view of the image pickup unit 2 and an explanatory diagram for explaining an interior of the network monitoring camera according to the third embodiment.
Figure 5C:
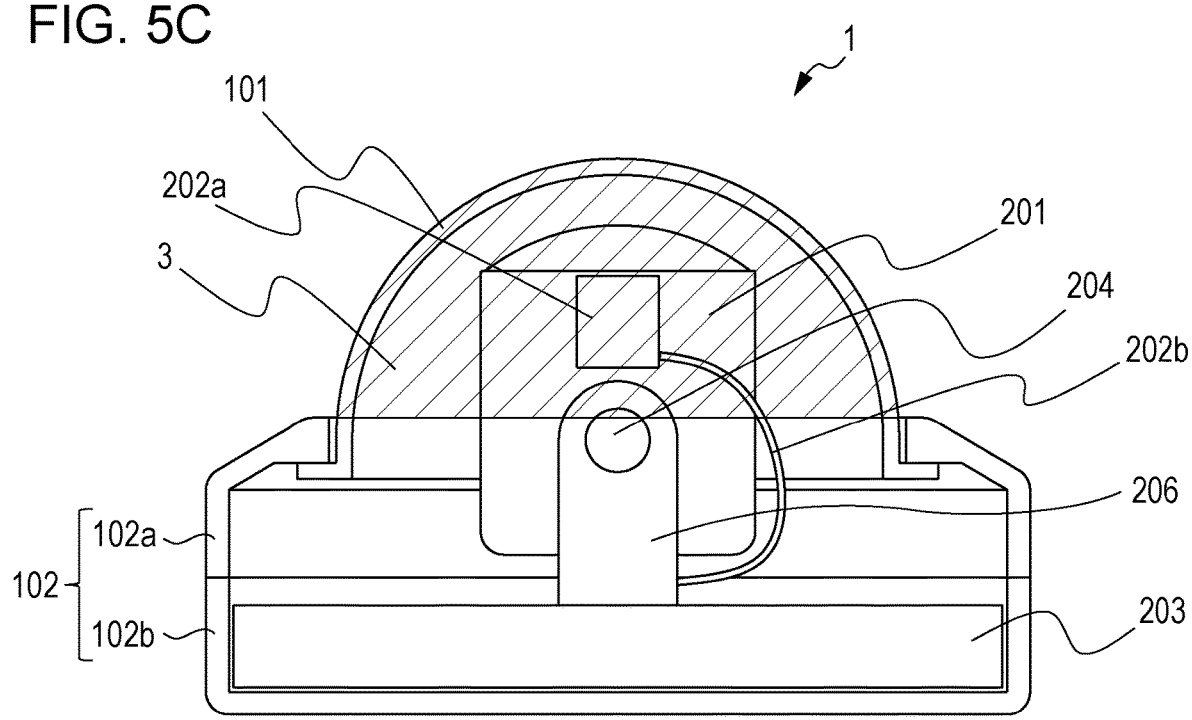
FIG. 5C is an explanatory diagram for explaining an interior of the network monitoring camera of the image pickup unit 2 according to the third embodiment.
Figure 5D:
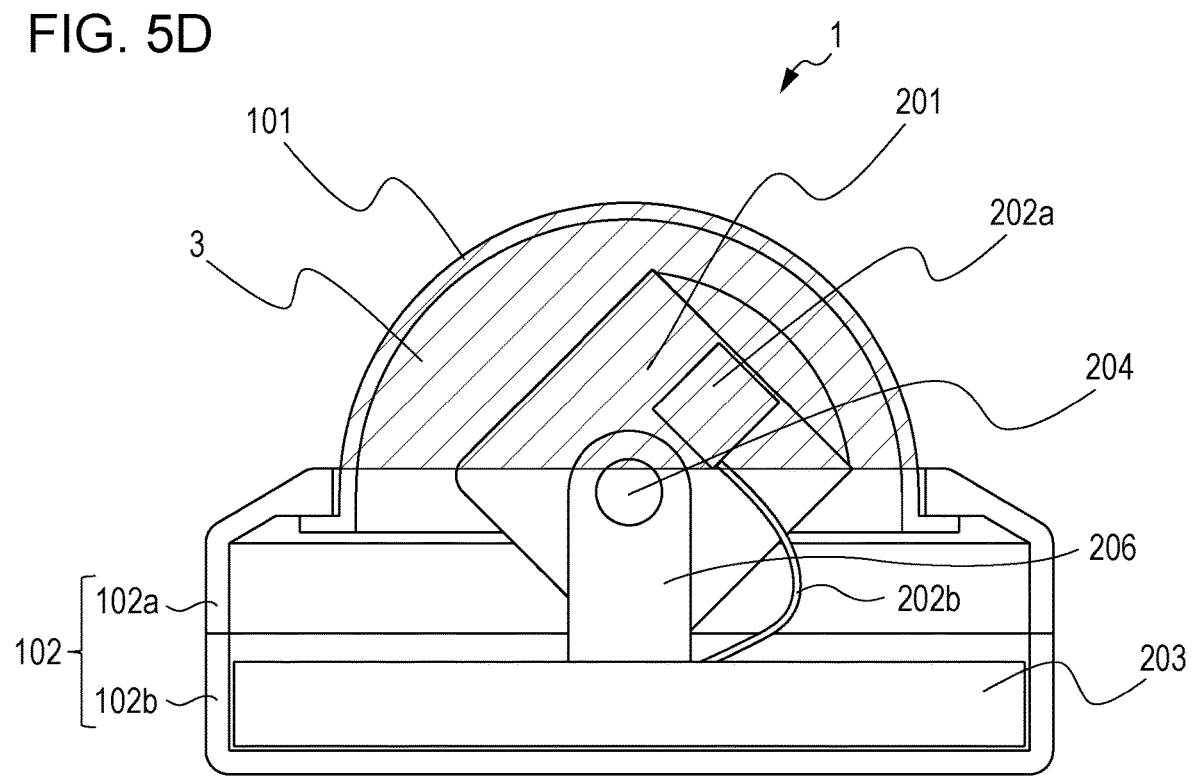
FIG. 5D is an explanatory diagram for explaining an interior of the network monitoring camera of the image pickup unit 2 according to the third embodiment.

A third embodiment differs from the second embodiment in the position of the antenna 202a and the size of the support portions 206b. The other configurations of the third embodiment are the same as those of the second embodiment and their description will be omitted. FIG. 5A is an exploded perspective view of the image pickup unit 2 according to the third embodiment. FIG. 5B is an explanatory diagram for explaining an interior of the monitoring camera 1 according to the third embodiment. FIG. 5C is an explanatory diagram for explaining an interior of the monitoring camera 1, with the lens unit 201 directed to the zenith. FIG. 5D is a diagram for explaining an interior of the monitoring camera 1, with the lens unit 201 rotated in the tilt direction.

In the third embodiment, the antenna 202a is secured to a side of the lens unit 201 adjacent to one of the support portions 206b. This means that the position of the antenna 202a with respect to the housing 102 changes as the lens unit 201 rotates in the tilt direction. Specifically, the antenna 202a is farthest from the housing 102 when the lens unit 201 is directed to the zenith, and becomes closer to the housing 102 as the lens unit 201 tilts. The antenna 202a is configured to be positioned inside the first space 3 indicated by diagonal lines, regardless of the position of the lens unit 201.

This configuration of the PT monitoring camera also enables high-performance wireless communication, because the antenna 202a is disposed away from the printed circuit board 207 that generates a lot of electrical noise and the housing 102 that is made of metal.

Additionally, securing the antenna 202a to the lens unit 201 eliminates the need for components that support the antenna 202a and this can reduce the size of the monitoring camera 1.

Fourth Embodiment

Figure 6A:
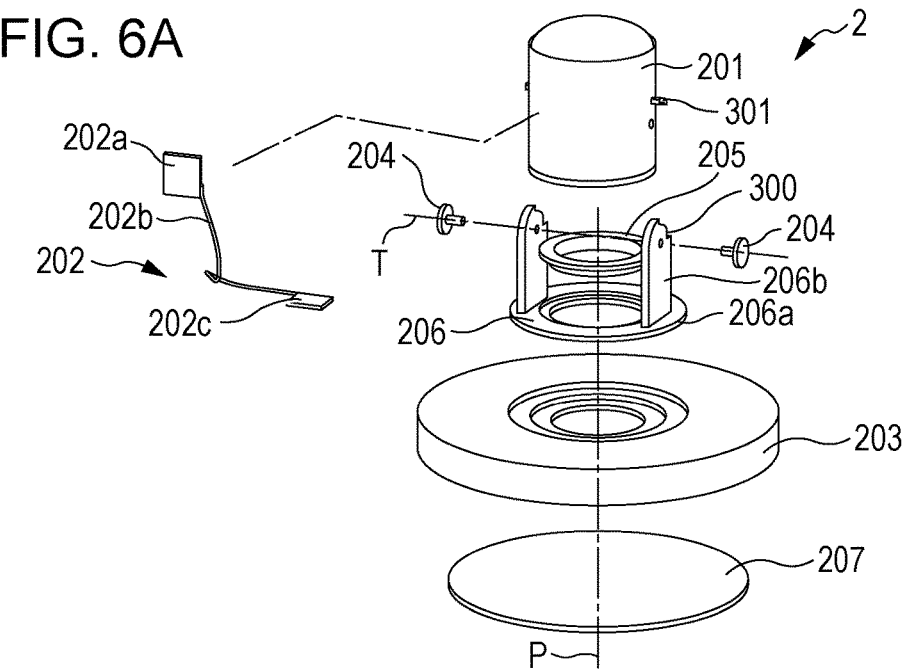
FIG. 6A presents an exploded perspective view of the image pickup unit 2 and an explanatory diagram for explaining an interior of a network monitoring camera according to a fourth embodiment.
Figure 6B:
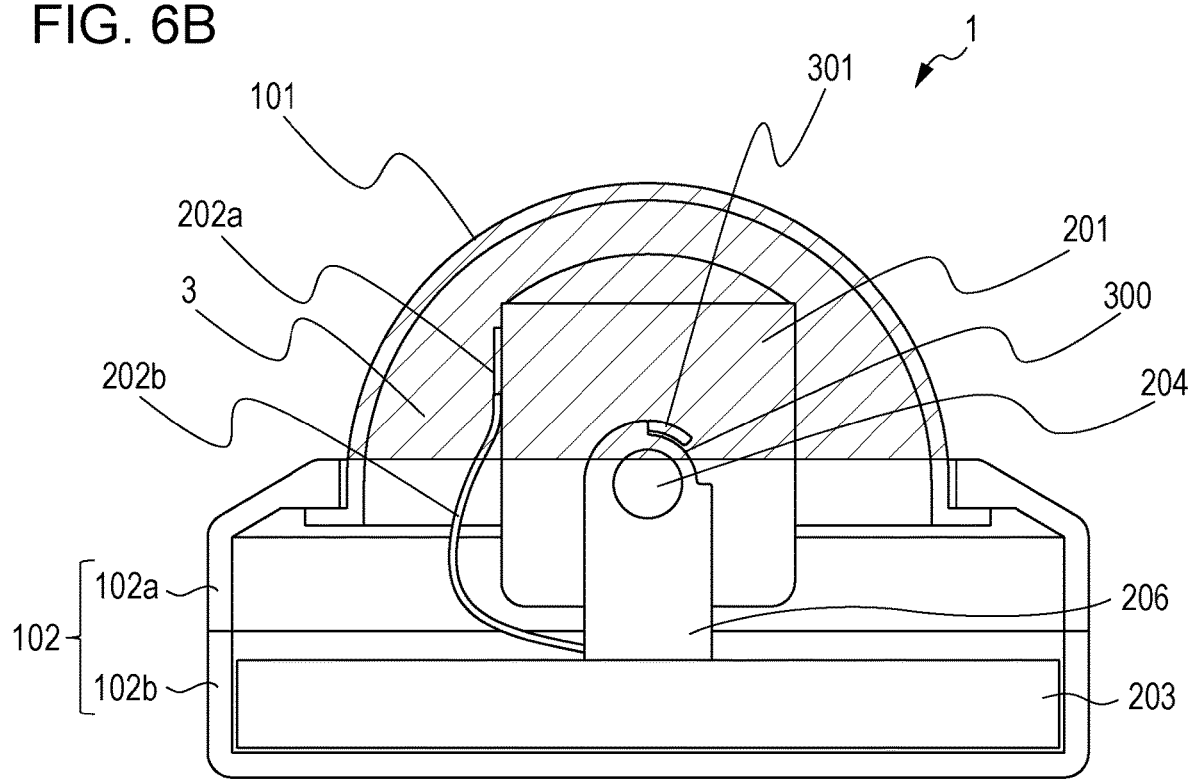
FIG. 6B presents an exploded perspective view of the image pickup unit 2 and an explanatory diagram for explaining an interior of the network monitoring camera according to the fourth embodiment.
Figure 6C:
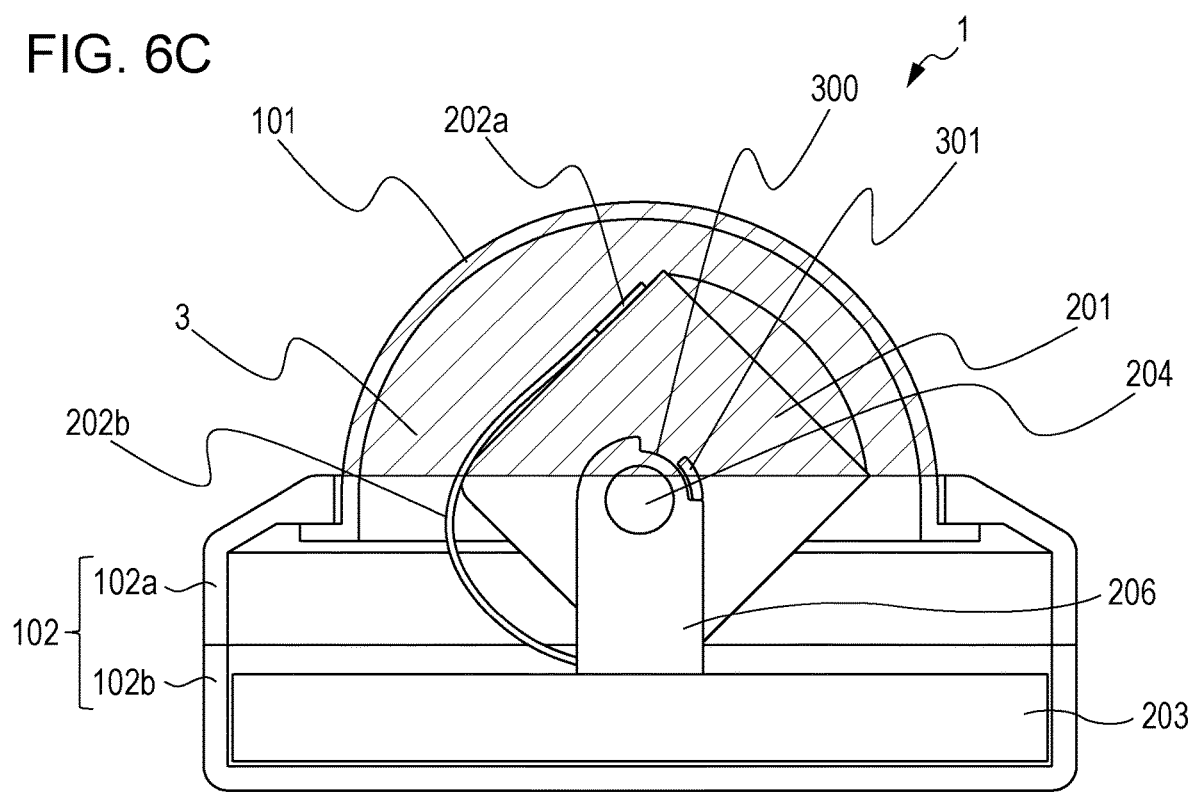
FIG. 6C is an explanatory diagram for explaining an interior of the network monitoring camera of the image pickup unit 2 according to the fourth embodiment.
Figure 6D:
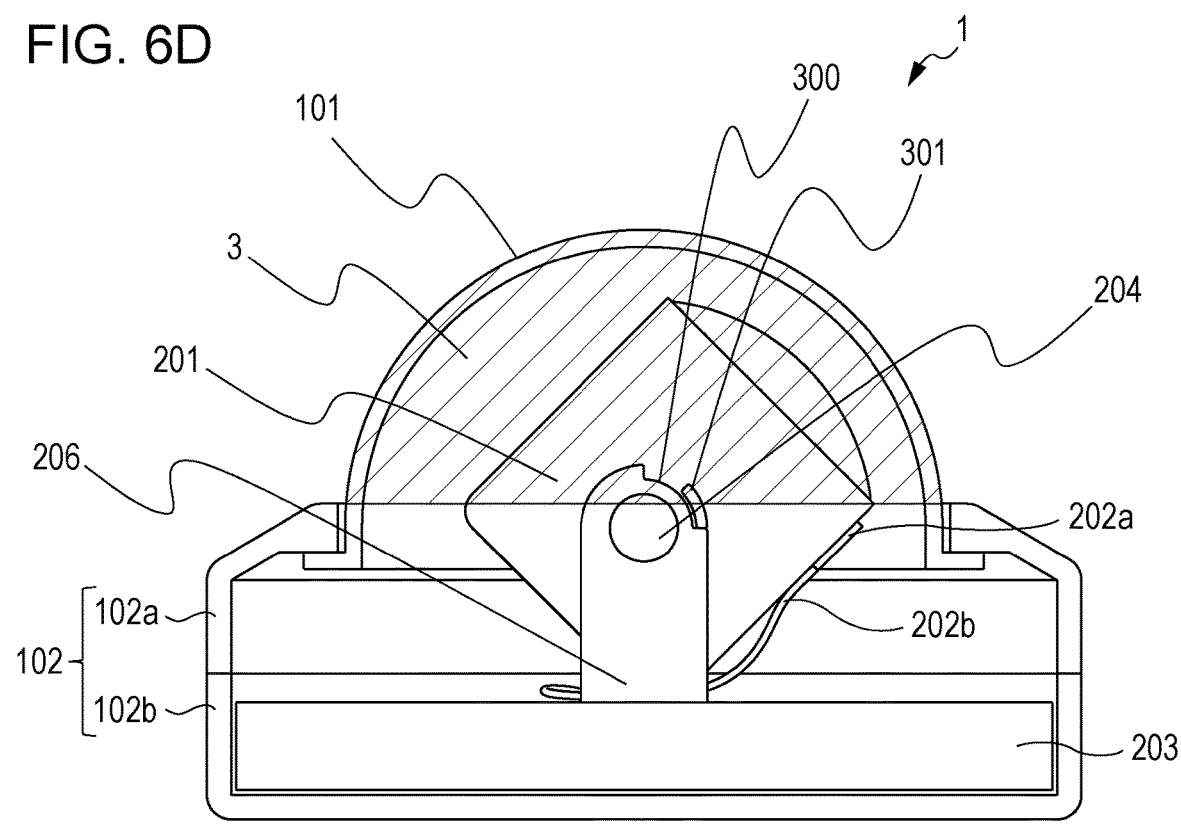
FIG. 6D is an explanatory diagram for explaining an interior of the network monitoring camera of the image pickup unit 2 according to the fourth embodiment.

The second embodiment and the third embodiment have dealt with examples where the lens unit 201 is capable of tilting and rotating about ±90° on both sides (with the zenith being a tilt angle of 0°). A fourth embodiment describes an example where the lens unit 201 is capable of tilting and rotating about 90° on one side. The fourth embodiment differs from the third embodiment in the position of the antenna 202a and in having a restricting means. The other configurations of the fourth embodiment are the same as those of the third embodiment and their description will be omitted. FIG. 6A is an exploded perspective view of the image pickup unit 2 according to the fourth embodiment. FIG. 6B is an explanatory diagram for explaining an interior of the monitoring camera 1 according to the fourth embodiment. FIG. 6C is an explanatory diagram for explaining an interior of the monitoring camera 1, with the lens unit 201 rotated in the tilt direction. FIG. 6D illustrates a comparative example of the monitoring camera 1, with the lens unit 201 tilted.

In the fourth embodiment, the antenna 202a is secured to the periphery of the lens unit 201. The antenna 202a is configured to be positioned inside the first space 3 indicated by diagonal lines, regardless of the position of the lens unit 201.

The monitoring camera 1 according to the fourth embodiment includes the restricting means that restricts rotation of the lens unit 201 in the tilt direction.

The restricting means includes protrusions 301 disposed on the lens unit 201, and guides 300 provided in the respective support portions 206*b* of the pan base 206 to guide the respective protrusions 301. The protrusions 301 are configured to hit the corresponding ends of the respective guides 300 to restrict the rotation of the lens unit 201. The restricting means restricts the rotation of the lens unit 201 in such a manner that when the lens unit 201 rotates in the tilt direction, at least part of the antenna 202*a* is positioned in the first space 3 of the dome cover 101. The restricting means is configured to allow the lens unit 201 to move only in the direction in which the antenna 202*a* becomes closer to the object (see FIG. 6C), and is configured not to allow the lens unit 201 to move in the direction in which the antenna 202*a* becomes farther from the object (see FIG. 6D).

This configuration of the PT monitoring camera also enables high-performance wireless communication, because the antenna 202*a* is disposed away from the printed circuit board 207 that generates a lot of electrical noise and the housing 102 that is made of metal.

Additionally, the restricting means restricts the rotation in the tilt direction to only one direction. This prevents the antenna 202*a* from moving in the direction away from the object, and enables higher-performance wireless communication.

Fifth Embodiment

A fifth embodiment describes an example in which the dome cover 101 contains therein an inner cover 208.

The configurations of the fifth embodiment are the same as those of the second embodiment, except the inner cover 208 and components therearound, and their description will be omitted.

Figure 7A:
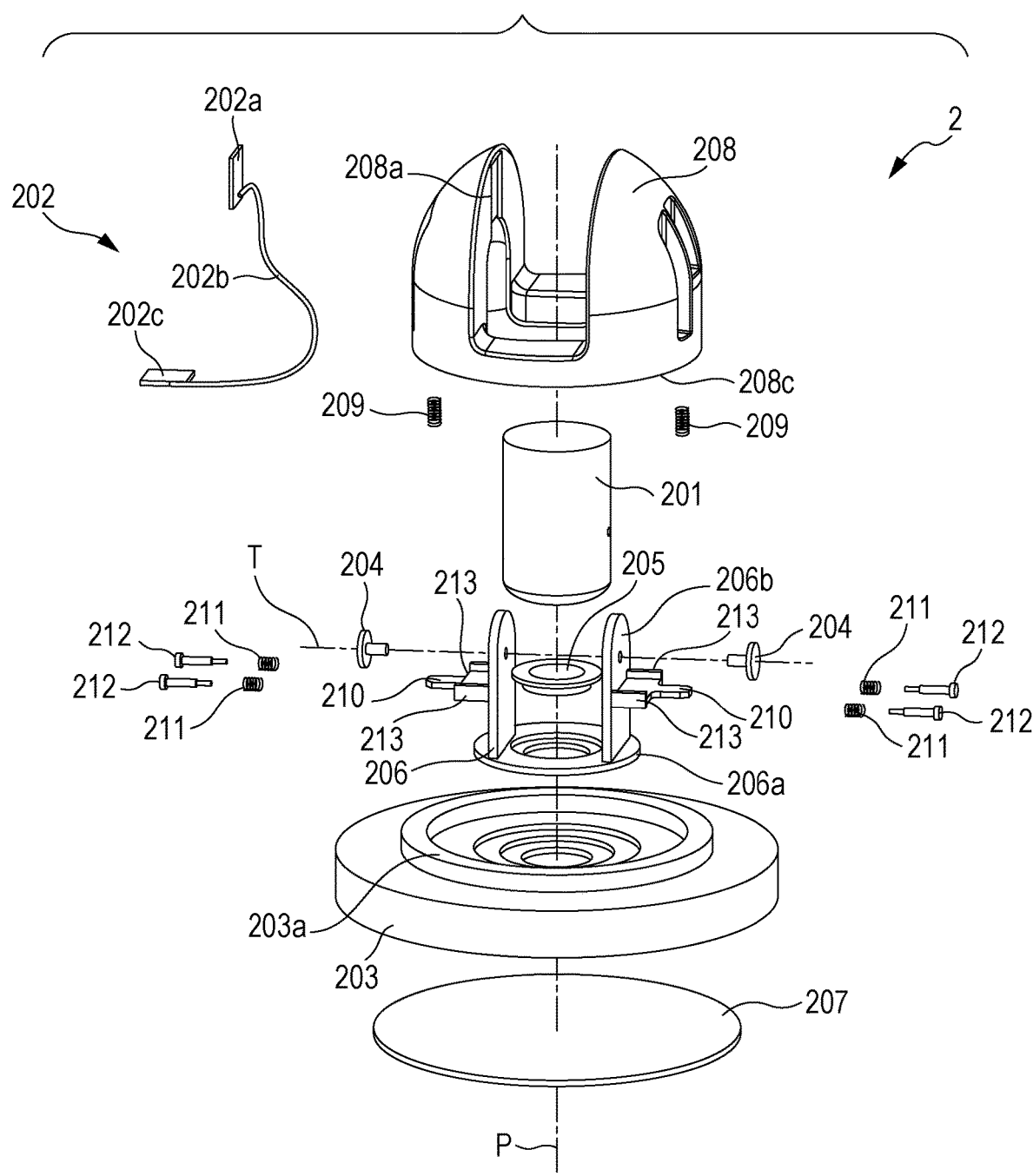
FIG. 7A presents an exploded perspective view of the image pickup unit 2 and an explanatory diagram for explaining an interior of a network monitoring camera according to a fifth embodiment.

FIG. 7A is an exploded perspective view of the image pickup unit 2 according to the fifth embodiment.

Figure 7B:
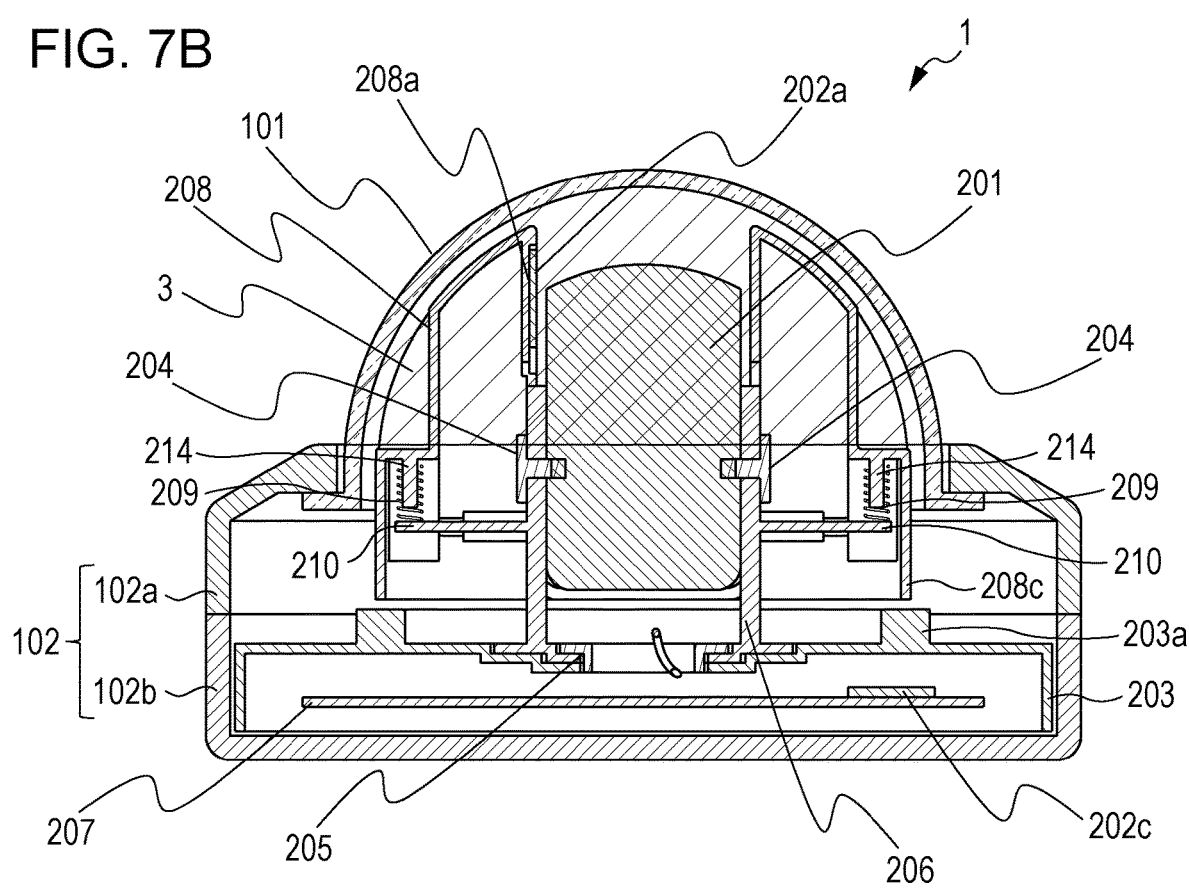
FIG. 7B is an explanatory diagram for explaining an interior of the network monitoring camera of the image pickup unit 2 according to the fifth embodiment.

FIG. 7B is an explanatory diagram for explaining an interior of the monitoring camera 1 according to the fifth embodiment.

Figure 7C:
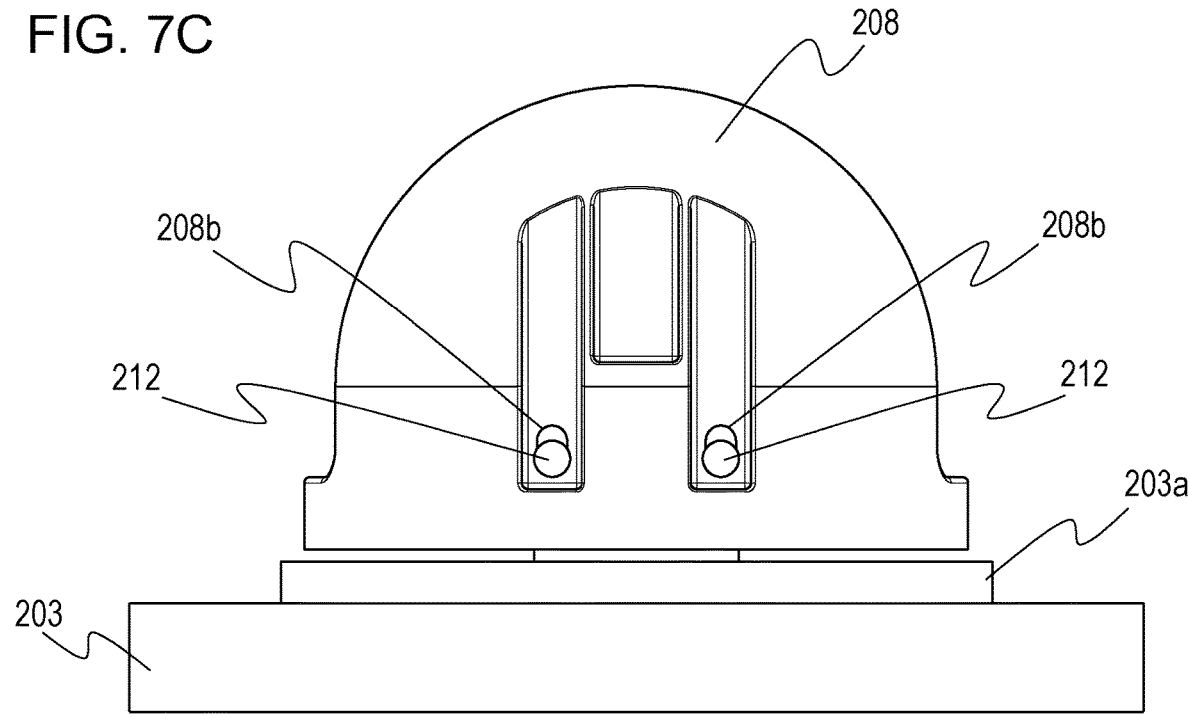
FIG. 7C is an explanatory diagram for explaining an interior of the network monitoring camera of the image pickup unit 2 according to the fifth embodiment.
Figure 7D:
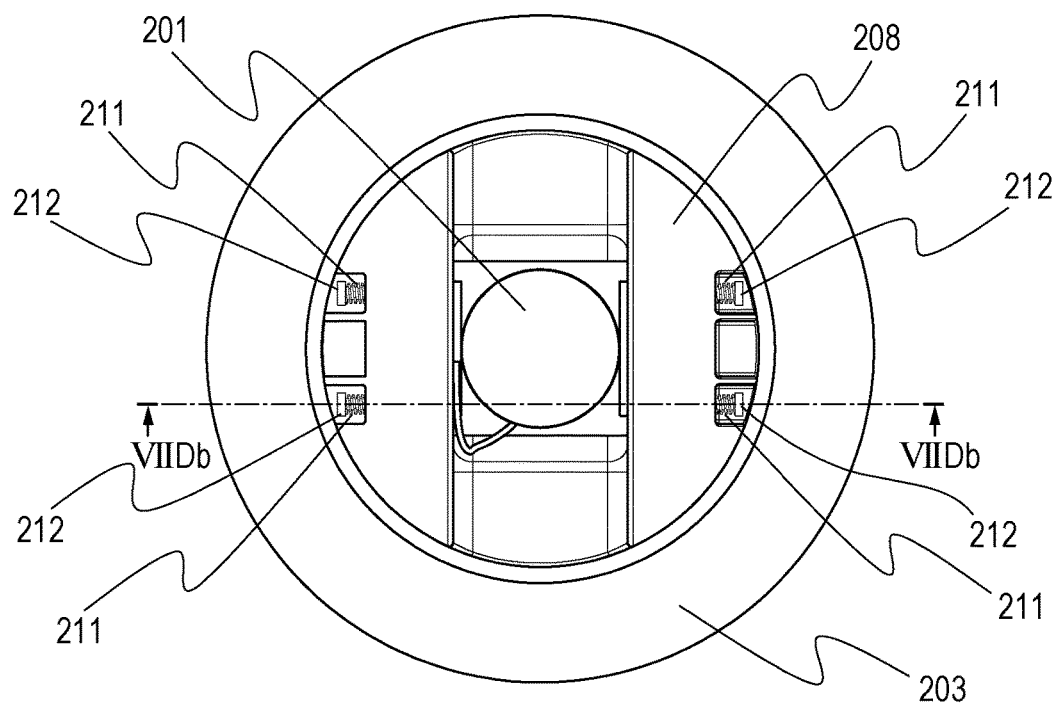
FIGS. 7Da and 7Db are explanatory diagrams for explaining an interior of the network monitoring camera of the image pickup unit 2 according to the fifth embodiment.
Figure 7D:
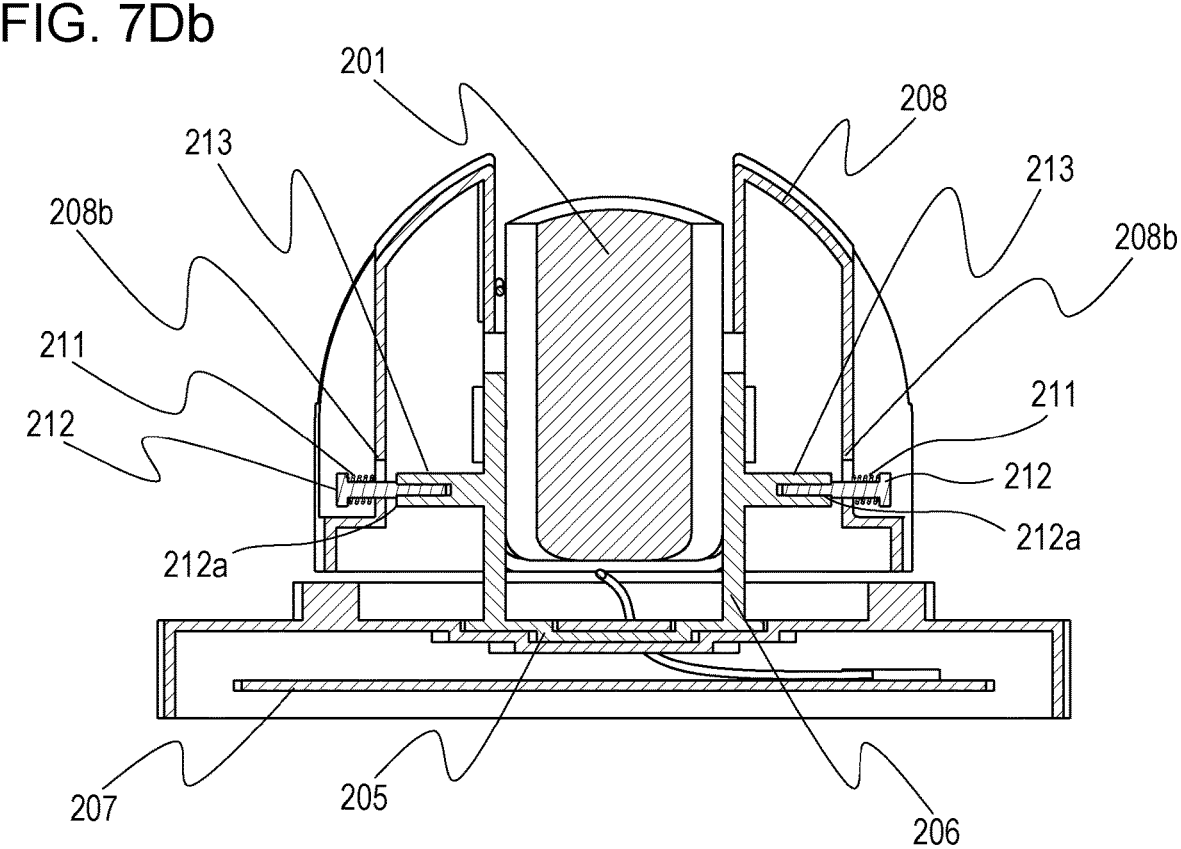

FIG. 7C and FIGS. 7Da and 7Db are explanatory diagrams for explaining how the inner cover 208 of the fifth embodiment is secured in place.

As illustrated in FIG. 7A to FIG. 7Db, the image pickup unit 2 according to the fifth embodiment includes the inner cover 208, elastic members 209, support portions 210 extending from the respective support portions 206*b*, elastic members 211, securing members 212, and securing portions 213 extending from the respective support portions 206*b*.

The inner cover 208 is secured to the pan base 206 by hole portions 208*b*, the elastic members 209, and the securing members 212 in such a manner as to be biased toward the object.

At the same time, the inner cover 208 is secured to the pan base 206 by the securing portions 213, the elastic members 211, and the securing members 212 in such a manner as to be biased in the direction of the tilt rotation axis.

This enables the inner cover 208 to rotate in conjunction with the pan motion of the pan base 206.

If the dome cover 101 is subjected to an external shock, the dome cover 101 is deformed inwardly and brought into contact with an upper end of the inner cover 208 before being brought into contact with the lens unit 201.

When brought into contact with the dome cover 101, the inner cover 208, which is biased and held by the elastic members 209 and 211, is moved opposite the object.

This brings a lower end portion 208*c* of the inner cover 208 into contact with the support portion 203*a* of the main base 203.

As described above, the inner cover 208 is configured to protect the lens unit 201 from an external shock. The antenna 202*a* is disposed in the substantially hemispherical first space 3 inside the dome cover 101, closer to the zenith of the dome cover 101 than the center of rotation in the tilt direction is (i.e., the antenna 202*a* is disposed opposite the housing 102 with respect to the center of rotation in the tilt direction). The antenna 202*a* is secured to a support portion 208*a* of the inner cover 208, for example, with screws (not shown).

Figure 7E:
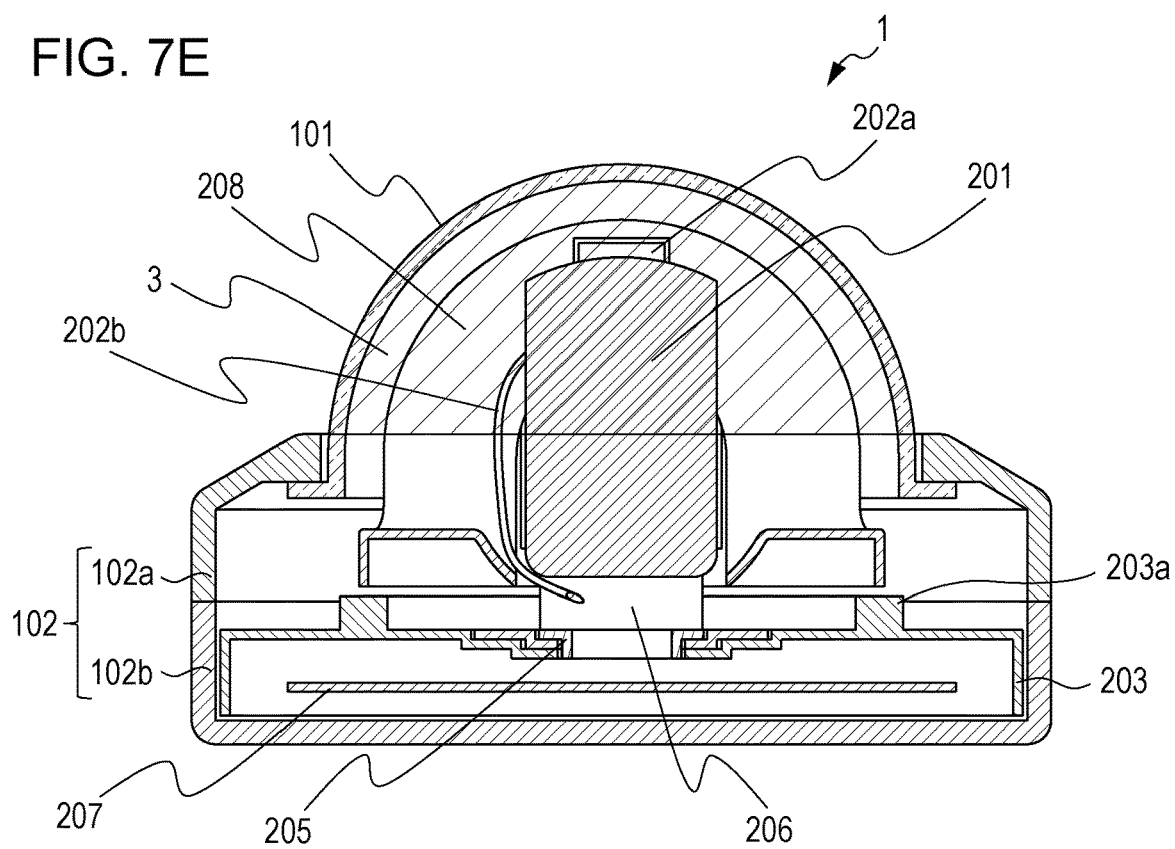
FIG. 7E is an explanatory diagram for explaining an interior of the network monitoring camera of the image pickup unit 2 according to the fifth embodiment.

FIG. 7E is an explanatory diagram for explaining an interior of the monitoring camera 1, with the lens unit 201 directed to the zenith.

Figure 7F:
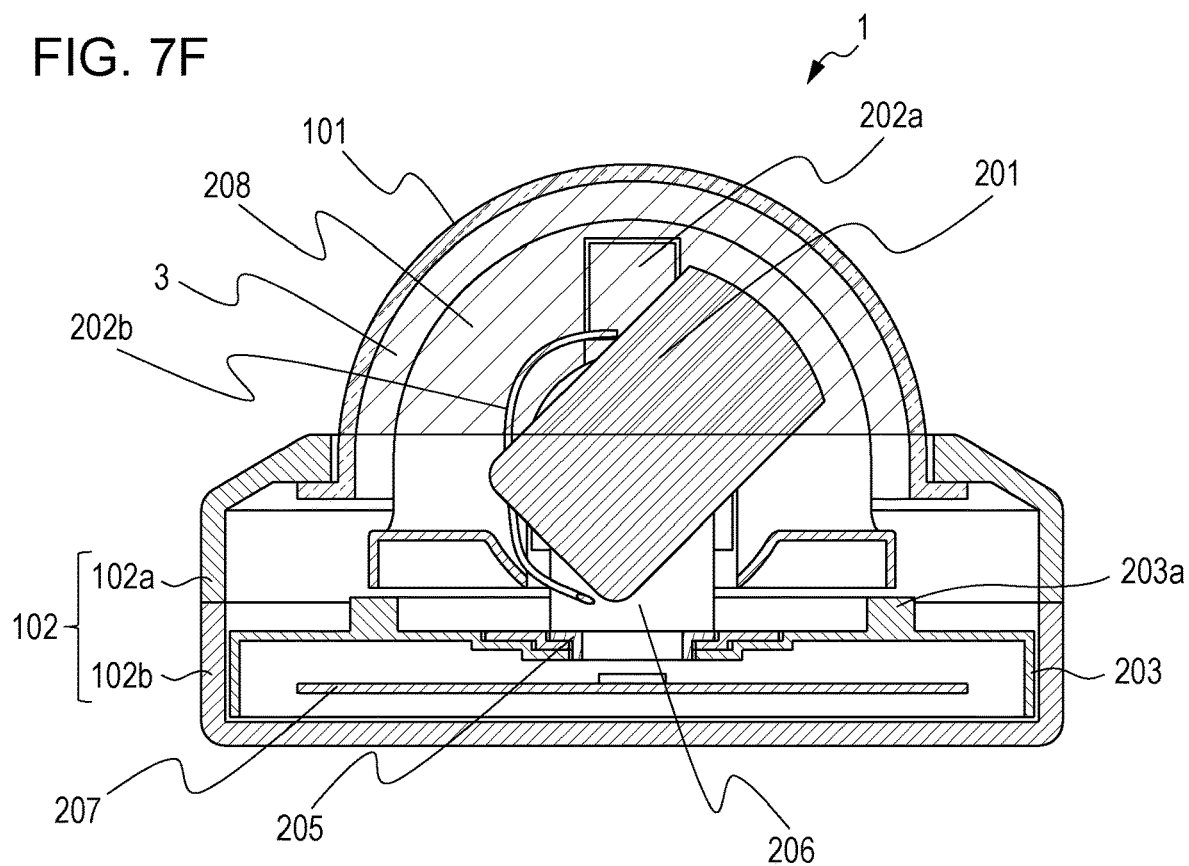
FIG. 7F is an explanatory diagram for explaining an interior of the network monitoring camera of the image pickup unit 2 according to the fifth embodiment.

FIG. 7F is an explanatory diagram for explaining an interior of the monitoring camera 1, with the lens unit 201 tilted.

As illustrated in FIG. 7E and FIG. 7F, the antenna 202*a* on the inner cover 208 is positioned inside the first space 3, regardless of the position of the lens unit 201 and regardless of the pan motion of the pan base 206.

This configuration allows the antenna 202*a* to be positioned closer to the zenith than in the second embodiment and enables higher-performance wireless communication.

Sixth Embodiment

A sixth embodiment describes an example where a light-shielding member 5 is mounted when the monitoring camera 1 is installed on a wall.

The monitoring camera 1 may be installed on an outdoor wall and exposed to direct sunlight.

When the monitoring camera 1 is exposed to direct sunlight, the resulting rise in temperature inside the housing 102 may cause the monitoring camera 1 to malfunction. Additionally, if the lens unit 201 is exposed to direct sunlight, the resulting damage to optical components may also cause the monitoring camera 1 to malfunction.

Accordingly, when the monitoring camera 1 is installed in a place exposed to direct sunlight, the light-shielding member 5 is generally attached to the monitoring camera 1.

For example, to ensure resistance to shock and corrosion outdoors, a metal material may be employed to form the light-shielding member 5. However, the monitoring camera 1 is covered with metal in this case. Since this interrupts transmission of radio waves from the antenna 202*a* to external devices, the quality of communication may be degraded.

Accordingly, a preferable relation between the antenna 202*a* and the light-shielding member 5 will be described.

Figure 8A:
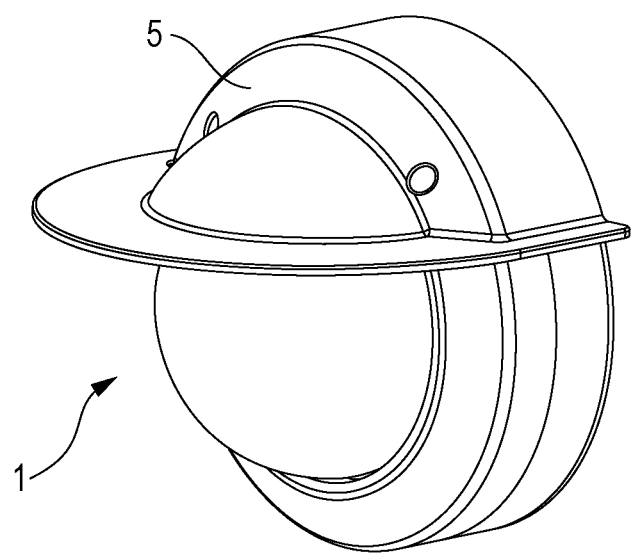
FIG. 8A presents an external view of a network monitoring camera and an explanatory diagram for explaining an interior of the network monitoring camera according to a sixth embodiment.

FIG. 8A is an external view of the monitoring camera 1 having the light-shielding member 5 mounted thereon according to the sixth embodiment.

FIG. 8B is an exploded perspective view of the monitoring camera 1 and the light-shielding member 5 according to the sixth embodiment.

FIG. 8C and FIG. 8D are explanatory diagrams each illustrating a relation between the monitoring camera 1 and the light-shielding member 5 according to the sixth embodiment.

Although the light-shielding member 5 is attached to the monitoring camera 1 of the third embodiment here, the same applies to the first, second, fourth, and fifth embodiments and their description will be omitted.

The light-shielding member 5 is secured to the housing 102 with securing means, such as screws 6.

The light-shielding member 5 is shaped to cover substantially the entire upper side of the monitoring camera 1 when the monitoring camera 1 is installed on a wall.

This can protect the dome cover 101, the housing 102, and the lens unit 201 from exposure to direct sunlight.

The antenna 202a is not covered with the light-shielding member 5 made of metal and is disposed in a second space 7 (indicated by diagonal lines in FIG. 8C and FIG. 8D) closer to the object than the metal housing 102 is.

This configuration, where the antenna 202a is disposed in the second space 7, enables high-performance wireless communication consistently even during the pan motion or tilt motion of the lens unit 201.

The configurations of the present invention are not limited to those illustrated in the embodiments and, for example, the materials, shapes, dimensions, forms, numbers, and positions described above may be changed as appropriate within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image pickup apparatus comprising:
   a lens unit;
   a dome cover;
   a housing configured to support the dome cover;
   an antenna capable of wirelessly communicating with an external device and having an antenna portion, an antenna substrate for receiving a signal from the antenna portion and a cable connecting the antenna portion with the antenna substrate; and
   a substrate disposed inside the housing and configured to control the image pickup apparatus,
   wherein the antenna portion is disposed in the dome cover and the antenna substrate is disposed on the substrate in the housing.

2. The image pickup apparatus according to claim 1, further comprising:
   a support portion configured to support the antenna portion; and
   a base configured to support the support portion,
   wherein the support portion protrudes from the base toward the dome cover,
   wherein one end of the support portion is disposed inside the housing and the other end of the support portion is disposed in the dome cover, and
   wherein the antenna is disposed at the other end of the support portion.

3. An image pickup apparatus comprising:
   a lens unit;
   a dome cover configured to cover the lens unit;
   a housing configured to support the dome cover;
   an antenna capable of wirelesssly communicating with an external device;
   a first base configured to support the lens unit in such a manner as to allow the lens unit to rotate in a tilt direction; and
   a second base configured to support the first base in such a manner as to allow the first base to rotate with respect to the housing in a pan direction,
   wherein the antenna is disposed in the dome cover and is disposed on the first base.

4. The image pickup apparatus according to claim 3, wherein the antenna is disposed opposite the second base with respect to a center of rotation in the tilt direction.

5. The image pickup apparatus according to claim 1, wherein the antenna is disposed on a periphery of the lens unit.

6. An image pickup apparatus comprising:
   a lens unit;
   a dome cover configured to cover the lens unit;
   a housing configured to support the dome cover;
   an antenna capable of wirelesssly communicating with an external device, wherein the antenna is disposed in the dome cover; and
   a restricting unit configured to restrict rotation of the lens unit in a tilt direction,
   wherein the restricting unit restricts rotation of the lens unit in such a manner that when the lens unit rotates in the tilt direction, at least part of the antenna is positioned in the dome cover.

7. An image pickup apparatus comprising:
   a lens unit;
   a dome cover configured to cover the lens unit;
   a housing configured to support the dome cover;
   an antenna capable of wirelesssly communicating with an external device;
   a first base configured to support the lens unit in such a manner as to allow the lens unit to rotate in a tilt direction; and
   an inner cover disposed inside the dome cover and supported by the first base,
   wherein the antenna is secured to the inner cover.

8. The image pickup apparatus according to claim 7, wherein the inner cover is biased to the first base by an elastic member.

9. The image pickup apparatus according to claim 1, wherein the housing is made of a metal material.

10. The image pickup apparatus according to claim 1, further comprising a light-shielding member attached to an outer side of the housing in such a manner as to cover the dome cover and the housing,
    wherein the antenna is disposed so as not to be covered by the light-shielding member.

11. The image pickup apparatus according to claim 10, wherein the light-shielding member is made of a metal material.

* * * * *